US012769968B2

(12) United States Patent
Uezu et al.

(10) Patent No.: US 12,769,968 B2
(45) Date of Patent: Oct. 20, 2026

(54) INFORMATION PROCESSING APPARATUS, NON-TRANSITORY COMPUTER READABLE MEDIUM STORING PROGRAM, AND INFORMATION PROCESSING METHOD THAT EVALUATE CONTRIBUTION OF PAPER REDUCTION

(71) Applicant: FUJIFILM Business Innovation Corp., Tokyo (JP)

(72) Inventors: Yoshimi Uezu, Kanagawa (JP); Takao Matsuoka, Kanagawa (JP); Tetsu Satani, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/190,115

(22) Filed: Mar. 26, 2023

(65) Prior Publication Data

US 2024/0104324 A1 Mar. 28, 2024

(30) Foreign Application Priority Data

Sep. 26, 2022 (JP) ................................ 2022-153090

(51) Int. Cl.
*G06K 15/00* (2006.01)

(52) U.S. Cl.
CPC ....... *G06K 15/4065* (2013.01); *G06K 15/002* (2013.01)

(58) Field of Classification Search
CPC .............. G06K 15/4065; G06K 15/002; G06F 3/1219; G06F 3/1259; G06F 3/1273; G06F 3/1285; G06F 3/1207
See application file for complete search history.

(56) References Cited

U.S. PATENT DOCUMENTS 8,830,511 B2 9/2014 Tanaka et al.
9,237,245 B2 1/2016 Tanaka et al.
2005/0058486 A1* 3/2005 Yamanaka ............ B41J 11/008 400/76
2012/0033250 A1* 2/2012 Grasso .................. G06Q 10/10 358/1.15
2012/0325101 A1* 12/2012 Tanaka .............. H04N 1/00278 101/483

(Continued)

FOREIGN PATENT DOCUMENTS

JP 2013012198 1/2013
JP 2013073367 4/2013

OTHER PUBLICATIONS

"Office Action of Europe Counterpart Application", issued on Mar. 24, 2025, p. 1-p. 6.

(Continued)

*Primary Examiner* — Iriana Cruz
(74) *Attorney, Agent, or Firm* — JCIPRNET

(57) ABSTRACT

An information processing apparatus includes a processor, in which the processor is configured to: acquire information related to an electronic output of data; derive the number of sheets virtually output in a case in which the data is output by the sheets, using the acquired information related to the electronic output of the data; and perform control to display a reduction value of the sheets reduced by the electronic output of the data, using the derived number of sheets virtually output.

11 Claims, 12 Drawing Sheets

(56) References Cited

U.S. PATENT DOCUMENTS

| | | | | |
|---|---|---|---|---|
| 2012/0327487 | A1* | 12/2012 | Kamisuwa | H04N 1/2338 358/527 |
| 2014/0233967 | A1* | 8/2014 | Suzuki | G06F 3/1208 399/81 |
| 2014/0307274 | A1* | 10/2014 | Rainero | G06F 3/1253 358/1.9 |

OTHER PUBLICATIONS

"Search Report of Europe Counterpart Application", issued on Sep. 15, 2023, pp. 1-7.
"Notice of Reasons for Refusal of Japan Counterpart Application", issued on May 12, 2026, with English translation thereof, p. 1-p. 4.

* cited by examiner

13

PRINTER DRIVER NAME DATABASE

| TYPE | PRINTER DRIVER NAME |
|---|---|
| VIRTUAL PRINTER | (VIRTUAL PRINTER DRIVER V1) |
| | (VIRTUAL PRINTER DRIVER V2) |
| | (VIRTUAL PRINTER DRIVER V3) |
| | • • • |
| PHYSICAL PRINTER | (PHYSICAL PRINTER DRIVER P1) |
| | • • • |

FIG. 6

13

VIRTUAL PRINT JOB LOG DATABASE

| COMPANY | OFFICE | PRINT INFORMATION | | | | | |
|---|---|---|---|---|---|---|---|
| | | UUID | PRINT DATE AND TIME | USER NAME | NUMBER OF LOGICAL PAGES | NUMBER OF PHYSICAL PAGES | PRINTER DRIVER NAME |
| COMPANY A | HEAD OFFICE | ⋮ | ⋮ | ⋮ | ⋮ | ⋮ | ⋮ |
| | KANAGAWA | 1234567 | 07-29-2022 T11:06:10 +09:00 | Taro Yamada | 10 | 5 | (VIRTUAL PRINTER DRIVER V1) |
| | | 1234568 | 07-29-2022 T11:06:11 +07:00 | Jiro Yoshida | 8 | 4 | (VIRTUAL PRINTER DRIVER V2) |
| | | ⋮ | ⋮ | ⋮ | ⋮ | ⋮ | ⋮ |
| | TOKYO | ⋮ | ⋮ | ⋮ | ⋮ | ⋮ | ⋮ |
| | ⋮ | ⋮ | ⋮ | ⋮ | ⋮ | ⋮ | ⋮ |
| COMPANY B | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

FIG. 7

13

PHYSICAL PRINT JOB LOG DATABASE

| COMPANY | OFFICE | PRINT INFORMATION | | | | | |
|---|---|---|---|---|---|---|---|
| | | UUID | PRINT DATE AND TIME | USER NAME | NUMBER OF LOGICAL PAGES | NUMBER OF PHYSICAL PAGES | PRINTER DRIVER NAME |
| COMPANY A | HEAD OFFICE | ⋮ | ⋮ | ⋮ | ⋮ | ⋮ | ⋮ |
| | KANAGAWA | 1234567 | 07-23-2022 T09:13:00 +09:00 | Taro Yamada | 8 | 2 | (PHYSICAL PRINTER DRIVER P1) |
| | | 1234568 | 07-23-2022 T09:13:00 +11:00 | Jiro Yoshida | 4 | 2 | (PHYSICAL PRINTER DRIVER P2) |
| | | ⋮ | ⋮ | ⋮ | ⋮ | ⋮ | ⋮ |
| | TOKYO | ⋮ | ⋮ | ⋮ | ⋮ | ⋮ | ⋮ |
| | ⋮ | ⋮ | ⋮ | ⋮ | ⋮ | ⋮ | ⋮ |
| COMPANY B | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

FIG. 8

13

TOTALIZATION RESULT DATABASE

| COMPANY | OFFICE | TOTALIZATION RESULT | | | | | | | | |
|---|---|---|---|---|---|---|---|---|---|---|
| | | ELECTRONIC FILE RATIO | | | NUMBER-OF-PRINTED-SHEETS SUPPRESSION RATIO | | | NUMBER OF SHEETS REDUCED | | |
| | | WHOLE COMPANY | FOR EACH OFFICE | FOR EACH USER | WHOLE COMPANY | FOR EACH OFFICE | FOR EACH USER | WHOLE COMPANY | FOR EACH OFFICE | FOR EACH USER |
| COMPANY A | HEAD OFFICE | 42.1 | ⋮ | ⋮ | 34.1 | ⋮ | ⋮ | 16 | ⋮ | ⋮ |
| | KANAGAWA | | 43.8 | 55.6 (USER ID: ab1357) | | 32.4 | 33.3 (USER ID: ab1357) | | 18 | 16 (USER ID: ab1357) |
| | | | | 53.2 (USER ID: ab1358) | | | 38.1 (USER ID: ab1358) | | | 14 (USER ID: ab1358) |
| | | | | ⋮ | | | ⋮ | | | ⋮ |
| | ⋮ | | ⋮ | ⋮ | | ⋮ | ⋮ | | ⋮ | ⋮ |
| ⋮ | ⋮ | ⋮ | ⋮ | ⋮ | ⋮ | ⋮ | ⋮ | ⋮ | ⋮ | ⋮ |

FIG. 9

INDIVIDUAL PRINT JOB LOG DATABASE

33

| PRINT INFORMATION | | | | | |
|---|---|---|---|---|---|
| UUID | PRINT DATE AND TIME | USER NAME | NUMBER OF LOGICAL PAGES | NUMBER OF PHYSICAL PAGES | PRINTER DRIVER NAME |
| ⋮ | ⋮ | ⋮ | ⋮ | ⋮ | ⋮ |
| 1234567 | 07-29-2022 T11:06:10 +09:00 | Taro Yamada | 10 | 5 | (VIRTUAL PRINTER DRIVER V1) |
| 1234568 | 07-29-2022 T11:06:11 +02:00 | Taro Yamada | 8 | 2 | (PHYSICAL PRINTER DRIVER P1) |
| ⋮ | ⋮ | ⋮ | ⋮ | ⋮ | ⋮ |

INFORMATION PROCESSING APPARATUS, NON-TRANSITORY COMPUTER READABLE MEDIUM STORING PROGRAM, AND INFORMATION PROCESSING METHOD THAT EVALUATE CONTRIBUTION OF PAPER REDUCTION

CROSS-REFERENCE TO RELATED APPLICATIONS

This application is based on and claims priority under 35 USC 119 from Japanese Patent Application No. 2022-153090 filed Sep. 26, 2022.

BACKGROUND

(i) Technical Field

The present disclosure relates to an information processing apparatus, a non-transitory computer readable medium storing a program, and an information processing method.

(ii) Related Art

JP2013-012198A discloses an environmental contribution support device that outputs a report capable of comprehensively evaluating a printing environmental load and that enables a user to maintain motivation for reducing an environmental load over a long period of time.

This environmental contribution support device includes a two-sided reduction calculation unit, an aggregation reduction calculation unit, a sheet reduction ratio calculation unit, a printing status character selection unit, a sheet reuse ratio calculation unit, a reuse status character selection unit, a sheet reduction message selection unit, a sheet reuse message selection unit, an advice setting unit, and a report creation unit. Then, in this environmental contribution support device, the report creation unit edits a character corresponding to a sheet reduction ratio calculated by the sheet reduction ratio calculation unit, a character corresponding to a sheet reuse ratio calculated by the sheet reuse ratio calculation unit, and a message set by the advice setting unit into a predetermined form.

SUMMARY

However, in a case in which an image is formed on a sheet, the number of sheets output is reduced by two-sided printing and totalization printing in which a plurality of pages are printed on one page in an image forming apparatus. Therefore, the degree of contribution to the environment is improved by, for example, a reduction in the number of sheets used. Further, it is also possible to understand a reduction value related to the number of sheets output, using the history of the two-sided printing and the totalization printing.

On the other hand, in recent years, digitization that stores data without performing image formation, such as the printing of the data on sheets, has been performed. It is possible to reduce the number of sheets output even with the digitization. However, studies on the digitization for storing data are insufficient, and there is room for the user to understand the degree of contribution of the actual reduction in the number of sheets by the two-sided printing, the totalization printing, and the digitization to the environment.

Aspects of non-limiting embodiments of the present disclosure relate to an information processing apparatus, a non-transitory computer readable medium storing a program, and an information processing method that can evaluate a degree of contribution of a reduction in the number of sheets by electronic output of data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor, in which the processor is configured to: acquire information related to an electronic output of data; derive the number of sheets virtually output in a case in which the data is output by the sheets, using the acquired information related to the electronic output of the data; and perform control to display a reduction value of the sheets reduced by the electronic output of the data, using the derived number of sheets virtually output.

BRIEF DESCRIPTION OF THE DRAWINGS

Exemplary embodiment(s) of the present invention will be described in detail based on the following figures, wherein:

FIG. 6 is a schematic diagram illustrating an example of a configuration of a virtual print job log database according to the exemplary embodiment of the present disclosure;

FIG. 7 is a schematic diagram illustrating an example of a configuration of a physical print job log database according to the exemplary embodiment of the present disclosure;

FIG. 8 is a schematic diagram illustrating an example of a configuration of a totalization result database according to the exemplary embodiment of the present disclosure;

FIG. 9 is a schematic diagram illustrating an example of a configuration of an individual print job log database according to the exemplary embodiment of the present disclosure;

DETAILED DESCRIPTION

Hereinafter, an exemplary embodiment of the present disclosure will be described in detail with reference to the drawings. In addition, here, a case in which the technique of the present disclosure is applied to an information processing system that provides a service of displaying information indicating a reduction value of sheets (hereinafter, referred to as a "sheet reduction value display service") to a plurality of companies having a plurality of offices will be described.

Figure 1:
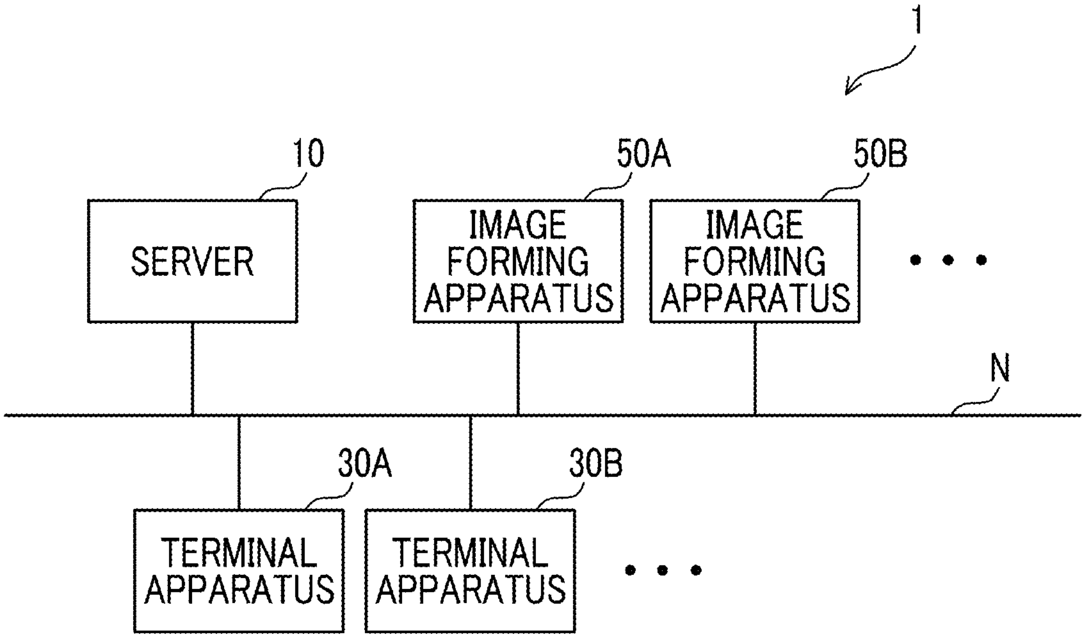
FIG. 1 is a block diagram illustrating an example of a configuration of an information processing system according to an exemplary embodiment of the present disclosure.

First, a configuration of an information processing system 1 according to this exemplary embodiment will be described with reference to FIG. 1. FIG. 1 is a block diagram illustrating an example of the configuration of the information processing system 1 according to this exemplary embodiment.

As illustrated in FIG. 1, the information processing system 1 according to this exemplary embodiment includes a server 10 as an information processing apparatus according to the technique of the present disclosure, a plurality of terminal apparatuses 30A, 30B, . . . , and a plurality of image forming apparatuses 50A, 50B, . . . . In addition, hereinafter, in a case in which the terminal apparatuses 30A, 30B, . . . are described without being distinguished from each other, the terminal apparatuses 30A, 30B, . . . are simply generically referred to as "terminal apparatuses 30". Further, hereinafter, in a case in which the image forming apparatuses 50A, 50B, . . . are described without being distinguished from each other, the image forming apparatuses 50A, 50B, . . . are simply generically referred to as "image forming apparatuses 50".

The server 10 according to this exemplary embodiment has a central role in providing the sheet reduction value display service, and the terminal apparatus 30 according to this exemplary embodiment is owned by each user (hereinafter, simply referred to as a "user") who belongs to each office of the plurality of companies. Then, the image forming apparatus 50 according to this exemplary embodiment is provided in each office of the plurality of companies and can be used by the user through the terminal apparatus 30.

Examples of the server 10 and the terminal apparatus 30 include information processing apparatuses such as a personal computer and a server computer. Further, in this exemplary embodiment, a digital multifunction apparatus having, for example, an image printing function, an image reading function, and an image transmission function is applied as the image forming apparatus 50. However, the present disclosure is not limited to this aspect. Another image forming apparatus, such as an image forming apparatus having only the image printing function or an image forming apparatus having only the image printing function and the image reading function may be applied as the image forming apparatus 50.

Not all of the image forming apparatuses 50A, 50B, . . . have the same specifications. It goes without saying that the image forming apparatuses 50A, 50B, . . . may have different executable services, different settable items for the services, and different installed optional items.

The server 10, the terminal apparatus 30, and the image forming apparatus 50 are connected to each other through a network N, and the server 10 can communicate with the terminal apparatus 30 and the image forming apparatus 50 through the network N.

In addition, in this exemplary embodiment, a combination of a public communication line, such as the Internet or a telephone network, and a communication line in a company, such as a local area network (LAN) or a wide area network (WAN), is applied as the network N. The present disclosure is not limited to this aspect. For example, only one of the public communication line and the communication line in the company may be applied as the network N. Further, in this exemplary embodiment, wired and wireless communication lines are applied as the network N. However, the present disclosure is not limited to this aspect, and only one of the wireless communication line and the wired communication line may be applied.

Figure 2:
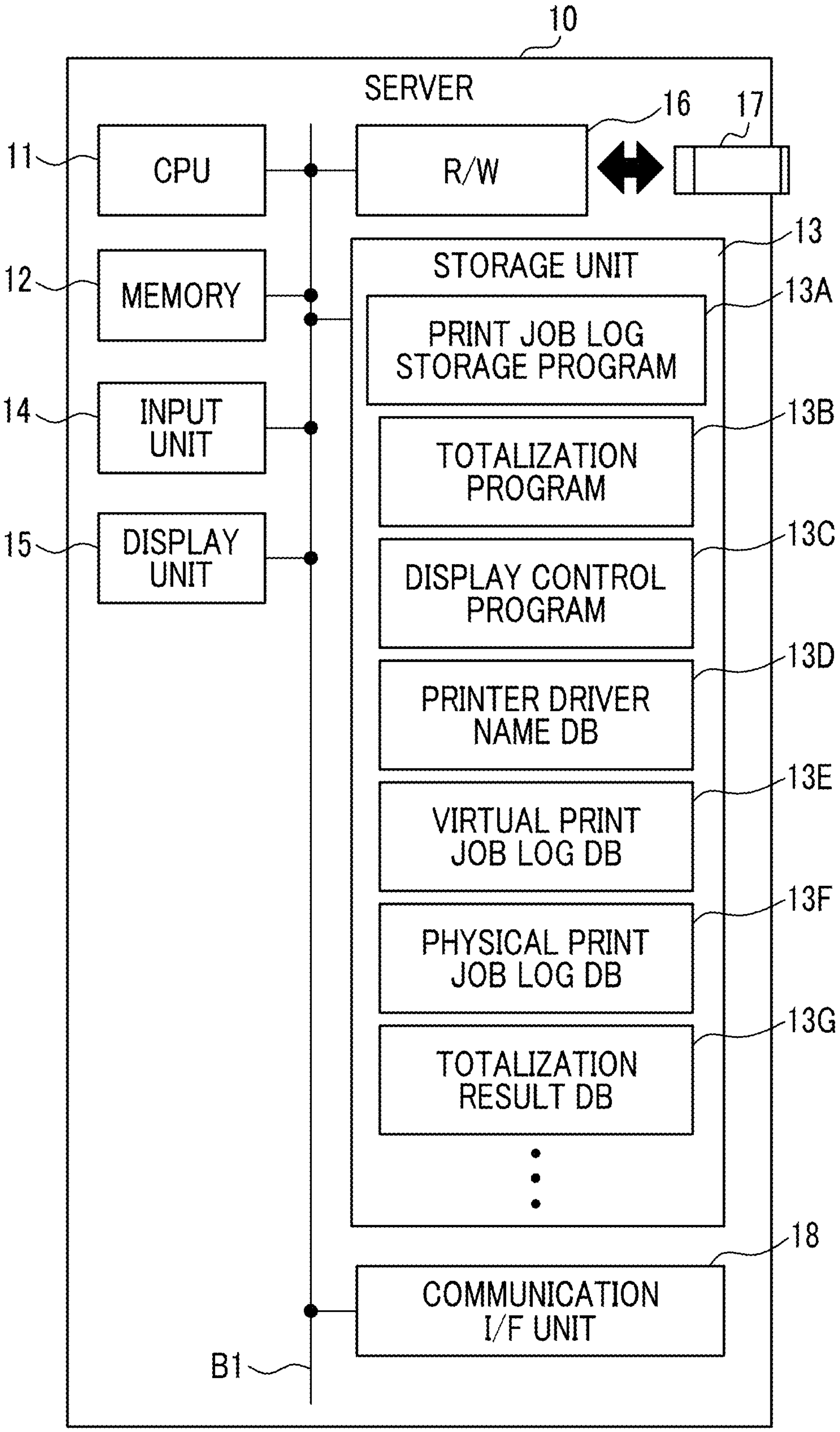
FIG. 2 is a block diagram illustrating an example of a hardware configuration of a server according to the exemplary embodiment of the present disclosure.

Next, the configuration of the server 10 according to this exemplary embodiment will be described with reference to FIG. 2. FIG. 2 is a block diagram illustrating an example of a hardware configuration of the server 10 according to this exemplary embodiment.

As illustrated in FIG. 2, the server 10 according to this exemplary embodiment includes a central processing unit (CPU) 11 as a processor, a memory 12 as a temporary storage area, a non-volatile storage unit 13, an input unit 14, such as a keyboard and a mouse, a display unit 15, such as a liquid crystal display, a medium reading/writing device (R/W) 16, and a communication interface (I/F) unit 18. The CPU 11, the memory 12, the storage unit 13, the input unit 14, the display unit 15, the medium reading/writing device 16, and the communication I/F unit 18 are connected to each other through a bus B1. The medium reading/writing device 16 reads information written on a recording medium 17 and writes information on the recording medium 17.

The storage unit 13 according to this exemplary embodiment is implemented by, for example, a hard disk drive (HDD), a solid state drive (SSD), or a flash memory. A print job log storage program 13A, a totalization program 13B, and a display control program 13C are stored in the storage unit 13 as a storage medium. The recording medium 17 on which each of the print job log storage program 13A, the totalization program 13B, and the display control program 13C has been written is connected to the medium reading/writing device 16, and the medium reading/writing device 16 reads each of the programs from the recording medium 17. Then, each of the storage mediums is stored (installed) in the storage unit 13. The CPU 11 appropriately reads each of the print job log storage program 13A, the totalization program 13B, and the display control program 13C from the storage unit 13, expands the programs in the memory 12, and sequentially executes processes included in each program.

In addition, a printer driver name database 13D, a virtual print job log database 13E, a physical print job log database 13F, and a totalization result database 13G are stored in the storage unit 13. Further, these databases will be described in detail below.

Figure 3:
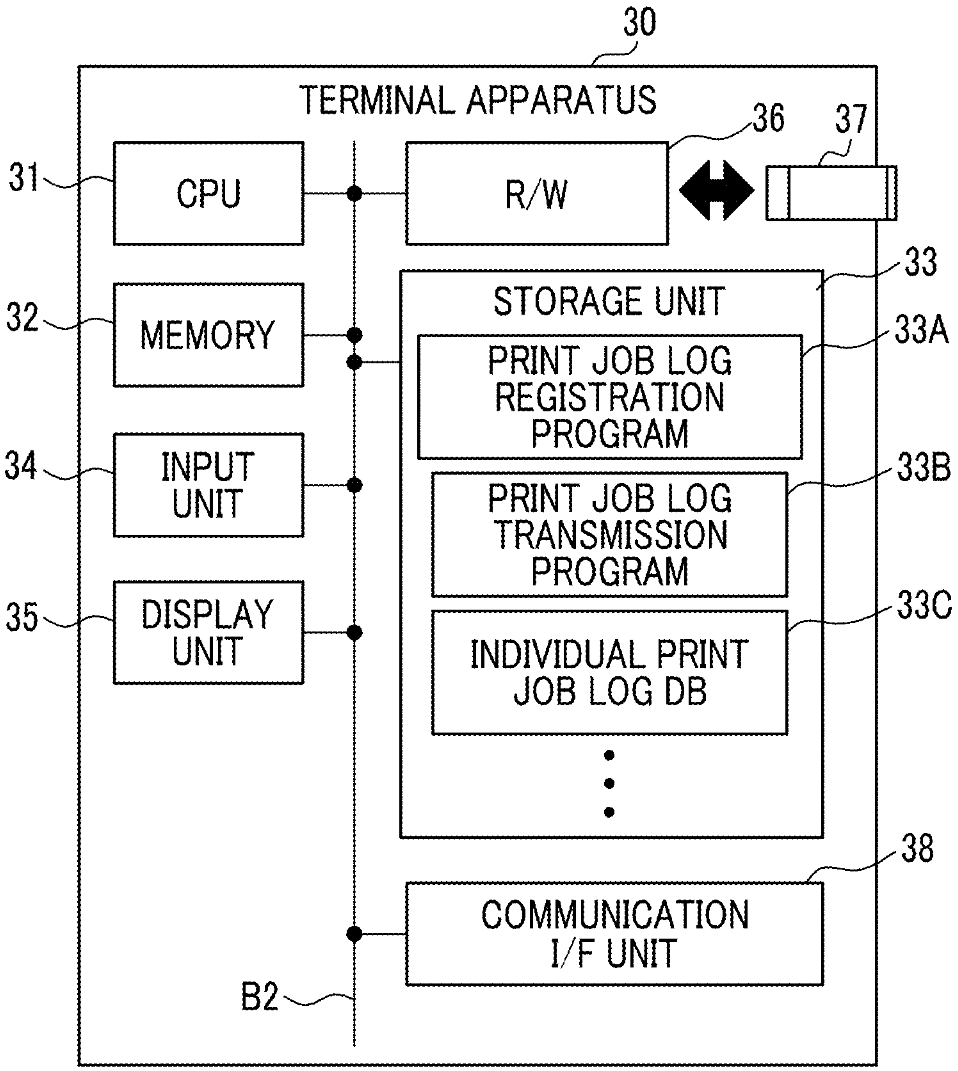
FIG. 3 is a block diagram illustrating an example of a hardware configuration of a terminal apparatus according to this exemplary embodiment of the present disclosure.

Next, a configuration of the terminal apparatus 30 according to this exemplary embodiment will be described with reference to FIG. 3. FIG. 3 is a block diagram illustrating an example of a hardware configuration of terminal apparatus 30 according to this exemplary embodiment.

As illustrated in FIG. 3, the terminal apparatus 30 according to this exemplary embodiment includes a CPU 31 as a processor, a memory 32 as a temporary storage area, a non-volatile storage unit 33, an input unit 34, such as a keyboard and a mouse, a display unit 35, such as a liquid crystal display, a medium reading/writing device (R/W) 36, and a communication I/F unit 38. The CPU 31, the memory 32, the storage unit 33, the input unit 34, the display unit 35, the medium reading/writing device 36, and the communication I/F unit 38 are connected to each other through a bus B2. The medium reading/writing device 36 reads information written on a recording medium 37 and writes information on the recording medium 37.

The storage unit 33 according to this exemplary embodiment is implemented by, for example, an HDD, an SSD, or a flash memory. A print job log registration program 33A and a print job log transmission program 33B are stored in the storage unit 33 as a storage medium. The recording medium 37 on which each of the print job log registration program 33A and the print job log transmission program 33B has been written is connected to the medium reading/writing device 36, and the medium reading/writing device 36 reads each of the programs from the recording medium 37. Then, each of the programs is stored (installed) in the storage unit 33. The CPU 31 reads each of the print job log registration program 33A and the print job log transmission program 33B from the storage unit 33, expands the programs in the memory 32, and sequentially executes processes included in each of the programs.

In addition, an individual print job log database 33C is stored in the storage unit 33. Further, the individual print job log database 33C will be described in detail below.

Figures 4, 5:
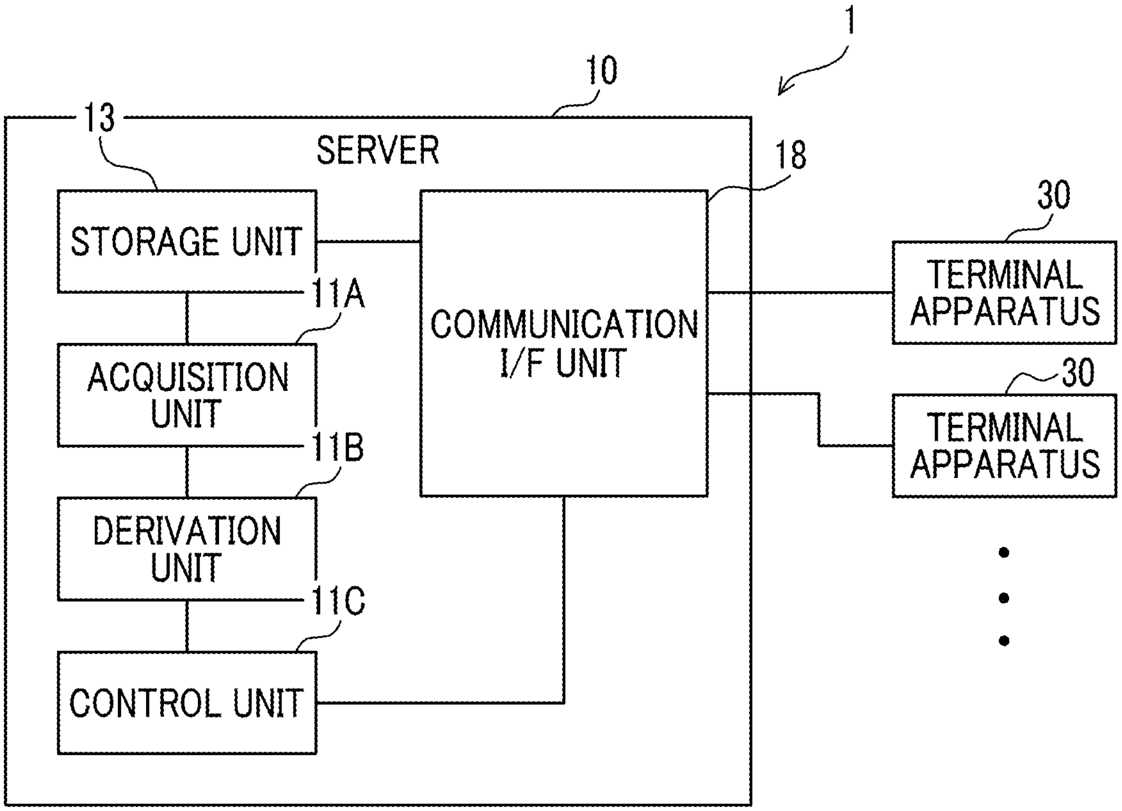
FIG. 4 is a block diagram illustrating an example of a functional configuration of the server according to the exemplary embodiment of the present disclosure.
FIG. 5 is a schematic diagram illustrating an example of a configuration of a printer driver name database according to the exemplary embodiment of the present disclosure.

Next, a functional configuration of the server 10 according to this exemplary embodiment will be described with reference to FIG. 4. FIG. 4 is a block diagram illustrating an example of the functional configuration of the server 10 according to this exemplary embodiment.

As illustrated in FIG. 4, the server 10 includes an acquisition unit 11A, a derivation unit 11B, and a control unit 11C. The CPU 11 of the server 10 executes the print job log storage program 13A, the totalization program 13B, and the display control program 13C to function as the acquisition unit 11A, the derivation unit 11B, and the control unit 11C.

The acquisition unit 11A according to this exemplary embodiment acquires information related to electronic output of data. In addition, the term "electronic output of data" means not only the physical output of data by sheets but also the creation of electronic data that can be physically output.

Further, the derivation unit 11B according to this exemplary embodiment derives the number of sheets virtually output in a case in which the data is output by the sheets, using the information related to the electronic output of the data acquired by the acquisition unit 11A. Then, the control unit 11C according to this exemplary embodiment performs control to display the reduction value of the sheets reduced by the electronic output of the data, using the number of sheets virtually output which has been derived by the derivation unit 11B.

In this exemplary embodiment, visible display by the display unit 35 of the terminal apparatus 30 is applied as the display controlled by the control unit 11C. However, the present disclosure is not limited thereto. For example, audible display by a voice reproduction device or permanent visible display by the image forming apparatus may be applied as the display controlled by the control unit 11C. Further, in this exemplary embodiment, the display unit 35 of the terminal apparatus 30 is applied as the display device to be subjected to the display control of the control unit 11C. However, the present disclosure is not limited thereto. For example, a display unit of the image forming apparatus 50 or the display unit 15 of the server 10 may be applied as the display device to be subjected to the display control of the control unit 11C.

Here, the acquisition unit 11A according to this exemplary embodiment acquires a history of the information related to the electronic output of the data from a storage unit (the storage unit 13 in this exemplary embodiment) that stores the history. In addition, the derivation unit 11B according to this exemplary embodiment derives the total number of sheets output and the total number of sheets virtually output, using the history acquired by the acquisition unit 11A. Further, the derivation unit 11B according to this exemplary embodiment derives a reduction ratio of the sheets indicating the ratio of the derived total number of sheets virtually output to the sum of the derived total number of sheets output and the derived total number of sheets virtually output. Then, the control unit 11C according to this exemplary embodiment performs control to display the reduction ratio of the sheets derived by the derivation unit 11B as the reduction value.

In addition, the acquisition unit 11A according to this exemplary embodiment further acquires a history of information indicating aggregate printing in which a plurality of pages are collectively printed on the sheet. Further, the term "aggregate printing" means printing including two-sided printing in which both sides of a sheet are printed and totalization printing in which a plurality of pages are printed on one page. Furthermore, the derivation unit 11B according to this exemplary embodiment further derives the reduction ratio of the sheets by the aggregate printing, using the history of the information indicating the aggregate printing acquired by the acquisition unit 11A. Then, the control unit 11C according to this exemplary embodiment performs control to display the reduction ratio of the sheets by the aggregate printing together with the reduction ratio of the sheet by the electronic output.

Here, the derivation unit 11B according to this exemplary embodiment derives a composite reduction ratio obtained by combining the reduction ratio of the sheets by the electronic output and the reduction ratio of the sheets by the aggregate printing. Then, the control unit 11C according to this exemplary embodiment performs control to display the composite reduction ratio derived by the derivation unit 11B. However, the present disclosure is not limited to this aspect, and the control unit 11C may perform control to individually display each of the reduction ratio of the sheets by the electronic output and the reduction ratio of the sheets by the aggregate printing.

In addition, the acquisition unit 11A according to this exemplary embodiment acquires the history of the information related to the electronic output of the data from a storage unit (in this exemplary embodiment, the storage unit 13) that stores the history for each user. The derivation unit 11B according to this exemplary embodiment derives the reduction value for each user, using the history acquired by the acquisition unit 11A. Then, the control unit 11C according to this exemplary embodiment performs control to display the reduction value for each user derived by the derivation unit 11B.

Next, the printer driver name database 13D according to this exemplary embodiment will be described with reference to FIG. 5. FIG. 5 is a schematic diagram illustrating an example of a configuration of the printer driver name database 13D according to this exemplary embodiment.

The printer driver name database 13D according to this exemplary embodiment is a database in which information indicating a name of a printer driver corresponding to the information processing system 1 according to this exemplary embodiment is registered. In the printer driver name database 13D according to this exemplary embodiment, as illustrated in FIG. 5 as an example, information items of a type and a printer driver name are stored in association with each other.

In the information processing system 1 according to this exemplary embodiment, a printer driver that controls a physical printer (in this exemplary embodiment, the image forming apparatus 50) for the physical output (printing) of data by the sheet is applied as the printer driver. Further, in the information processing system 1 according to this exemplary embodiment, a printer driver that creates electronic data which can be physically output (printed) is also applied as the printer driver. As described above, the printer driver for creating the electronic data creates data, which can be printed by a virtual printer, as the electronic data. Therefore, hereinafter, this printer driver is referred to as a "printer driver for a virtual printer".

The type in the printer driver name database 13D is information indicating a distinction between the printer driver for a physical printer and the printer driver for a virtual printer, and the printer driver name is information indicating the name of the above-described printer driver. In addition, "DocuWorks Printer Driver" and "Microsoft Print To PDF" are given as examples of the printer driver name for a virtual printer. Further, "FUJIFILM Apeos C5570" is given as an example of the printer driver name for a physical printer.

Next, the virtual print job log database 13E according to this exemplary embodiment will be described with reference to FIG. 6. FIG. 6 is a schematic diagram illustrating an example of a configuration of the virtual print job log database 13E according to this exemplary embodiment.

The virtual print job log database 13E according to this exemplary embodiment is a database in which print job logs by the virtual printer that are the histories of print information, which is information related to the printing of the electronic data created by the printer driver for a virtual printer, are registered. In the virtual print job log database 13E according to this exemplary embodiment, as illustrated in FIG. 6 as an example, information items of a company, an office, and print information are stored in association with each other.

The company is information indicating the name of a company corresponding to the information processing system 1 according to this exemplary embodiment, and the office is information indicating the name of an office of the corresponding company. Then, the print information is information indicating the above-described print information related to the electronic data created by the printer driver for a virtual printer in the corresponding office. As illustrated in FIG. 6, in this exemplary embodiment, the print information includes information items of a universally unique identifier (UUID), a print date and time, a user name, the number of logical pages, the number of physical pages, and a printer driver name.

The UUID is information that is given as different information for each electronic data item in order to identify the corresponding electronic data. The print date and time is information indicating the date and time when the corresponding electronic data has been created, and the user name is information indicating the name of the user who has created the corresponding electronic data. In addition, the number of logical pages is information indicating the number of pages of the document to be printed by the corresponding electronic data, and the number of physical pages is information indicating the number of pages in a case in which the document to be printed is actually printed by the corresponding electronic data. Further, the printer driver name is information indicating the name of the printer driver that has created the corresponding electronic data.

The printer driver according to this exemplary embodiment is configured such that the above-described aggregate printing (two-sided printing and totalization printing in this exemplary embodiment) can be set, and the number of sheets printed can be smaller than the actual number of pages of the document to be printed by performing the aggregate printing. The number of physical pages according to this exemplary embodiment indicates the number of sheets printed, and the performance of the aggregate printing makes it possible to print the pages whose number is smaller than the number of logical pages.

In the example illustrated in FIG. 6, for a document corresponding to electronic data to which "1234567" is given as the UUID created at a Kanagawa office of Company A, the actual number of pages is 10, and two-sided printing or totalization printing in which data corresponding to two pages of the document is printed on one page is performed. Therefore, in this case, the number of physical pages is 5 which is half the number of logical pages.

Next, the physical print job log database 13F according to this exemplary embodiment will be described with reference to FIG. 7. FIG. 7 is a schematic diagram illustrating an example of a configuration of the physical print job log database 13F according to this exemplary embodiment.

The physical print job log database 13F according to this exemplary embodiment is a database in which print job logs by the physical printer that are the histories of print information which is information related to the printing of the image forming apparatus 50 by the printer driver for a physical printer is registered.

As illustrated in FIG. 7, the physical print job log database 13F according to this exemplary embodiment differs from the virtual print job log database 13E illustrated in FIG. 6 only in that the corresponding printer driver is the printer driver for a physical printer. Therefore, further description of the physical print job log database 13F will be omitted.

Next, the totalization result database 13G according to this exemplary embodiment will be described with reference to FIG. 8. FIG. 8 is a schematic diagram illustrating an example of a configuration of the totalization result database 13G according to this exemplary embodiment.

The totalization result database 13G according to this exemplary embodiment is a database in which information indicating the degree of contribution to environmental improvement, which is achieved by the creation of the electronic data or the aggregate printing, is registered. In the totalization result database 13G according to this exemplary embodiment, as illustrated in FIG. 8 as an example, information items of a company, an office, and a totalization result are stored in association with each other.

The information items of the company and the office are the same as the information items of the company and the office in the virtual print job log database 13E and the physical print job log database 13F. Then, the totalization result is information indicating the totalization result of the information indicating the degree of contribution to environmental improvement for each corresponding company or each corresponding office.

As illustrated in FIG. 8, in this exemplary embodiment, three types of information of an electronic file ratio, a number-of-printed-sheets suppression ratio, and the number of sheets reduced are applied as the information indicating the totalization result. The number-of-printed-sheets suppression ratio corresponds to the reduction ratio of the sheets and the composite reduction ratio in the technique of the present disclosure. Hereinafter, a method for calculating the three types of information will be described. In addition, in the following expressions, RLP indicates the number of logical pages in a case in which data is not digitized (that is, in a case in which the data is directly printed), and RPP indicates the number of physical pages in a case in which the data is not digitized. Further, in the following expressions, VLP indicates the number of logical pages in a case in which the data is digitized, and VPP indicates the number of physical pages in a case in which the data is digitized.

The number of sheets reduced vrn according to this exemplary embodiment is information indicating the number of pages of sheets reduced in the printing of the document and is calculated by, for example, the following Expression (1).

$$vrn = VLP + (RLP - RPP) \tag{1}$$

That is, the number of sheets reduced vrn calculated by Expression (1) is the sum of the number of pages not printed by digitization (that is, the number of logical pages VLP) and the number of pages which is printed without being digitized, but is reduced by the aggregate printing (that is, a value obtained by subtracting the number of physical pages RPP from the number of logical pages RLP).

In addition, the number-of-printed-sheets suppression ratio vrr according to this exemplary embodiment is information indicating the ratio of the number of pages of sheets reduced to the total number of pages of the document in the printing of the document and is calculated by, for example, the following Expression (2).

$$vrr = \frac{VLP + (RLP - RPP)}{RLF + VLP} = \frac{vrn}{RLP + VLP} \tag{2}$$

That is, the number-of-printed-sheets suppression ratio vrr calculated by Expression (2) is the ratio of the number of sheets reduced vrn to the sum (that is, the total number of pages of the document) of the number of logical pages RLP in a case in which the data is not digitized and the number of logical pages VLP in a case in which the data is digitized.

Then, the electronic file ratio efr according to this exemplary embodiment is information indicating the ratio of the number of pages of the digitized sheets to the total number of pages of the document in the printing of the document and is calculated by, for example, the following Expression (3).

$$efr = \frac{VLP}{RLP + VLP} \tag{3}$$

That is, the electronic file ratio efr calculated by Expression (3) is the ratio of the number of logical pages VLP in a case in which the data is digitized to the total number of pages of the document which is the sum of the number of logical pages RLP in a case in which the data is not digitized and the number of logical pages VLP in a case in which the data is digitized.

In addition, each of the above-described Expressions (1) to (3) is an example, and it goes without saying that various changes, such as the addition of a new term and the multiplication of each term by a coefficient, can be made.

As illustrated in FIG. 8, in this exemplary embodiment, as the information indicating the totalization results, the above-described three types of totalization results are registered for each whole company, each office, and each user.

Next, the individual print job log database 33C according to this exemplary embodiment will be described with reference to FIG. 9. FIG. 9 is a schematic diagram illustrating an example of a configuration of the individual print job log database 33C according to this exemplary embodiment.

The individual print job log database 33C according to this exemplary embodiment is a database in which the above-described print job logs related to the user who uses the corresponding terminal apparatus 30 are registered. As illustrated in FIG. 9 as an example, in the individual print job log database 33C according to this exemplary embodiment, the same print information (information items of a UUID, a print date and time, a user name, the number of logical pages, the number of physical pages, and a printer driver name) as that in the virtual print job log database 13E and the physical print job log database 13F is stored in association with each other.

However, in the individual print job log database 33C, two types of printer drivers of a printer driver for a virtual printer and a printer driver for a physical printer are applied as the types of the corresponding printer drivers. In addition, the UUID, the print date and time, the user name, the number of logical pages, the number of physical pages, and the printer driver name are the same information as the information items having the same names in the virtual print job log database 13E and the physical print job log database 13F. Therefore, further description of these information items will be omitted.

Figure 10:
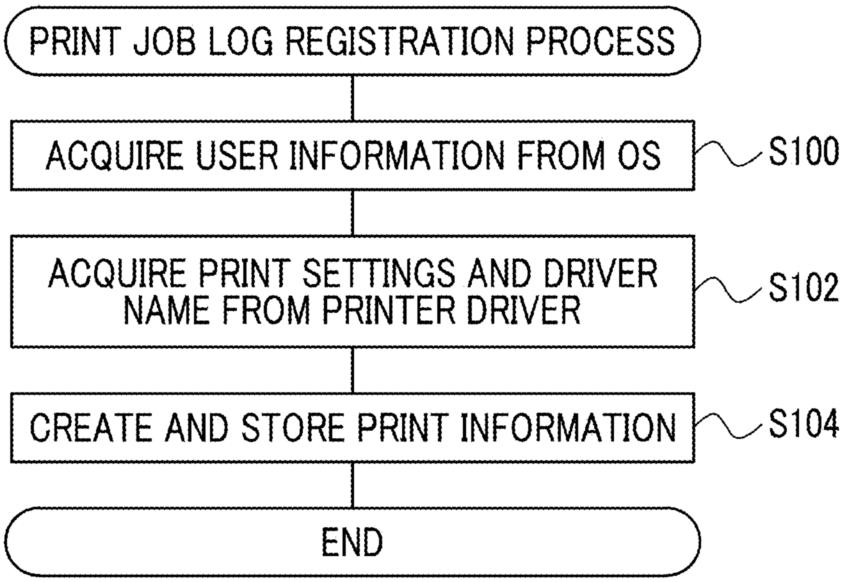
FIG. 10 is a flowchart illustrating an example of a print job log registration process according to the exemplary embodiment of the present disclosure.

Next, the operation of the information processing system 1 according to this exemplary embodiment will be described with reference to FIGS. 10 to 15. First, the operation of the terminal apparatus 30 in a case in which a print job log registration process is performed will be described with reference to FIG. 10. FIG. 10 is a flowchart illustrating an example of the print job log registration process according to this exemplary embodiment.

In this exemplary embodiment, at the time when the user performs printing by the physical printer or printing by the virtual printer (the creation of electronic data) with any of the terminal apparatuses 30, the CPU 31 of the terminal apparatus 30 executes the print job log registration program 33A to perform the print job log registration process illustrated in FIG. 10. In addition, hereinafter, the printer driver used in a case in which the printing by the physical printer or the printing by the virtual printer is performed is referred to as a "target driver".

In Step S100 of FIG. 10, the CPU 31 acquires information for specifying a user (hereinafter, referred to as "user information") obtained in a case in which the user logs into his or her own apparatus from an operating system (OS) installed in the host apparatus. In this exemplary embodiment, information indicating the name of the user is applied as the user information. However, the present disclosure is not limited thereto. For example, identification (ID) information assigned in advance to each user may be applied as the user information.

In Step S102, the CPU 31 acquires information items of information indicating print settings (for example, whether or not two-sided printing is performed, whether or not totalization printing is performed, and the number of pages printed per one side of a sheet in the case of the totalization printing) and the printer driver name from the target driver. In Step S104, the CPU 31 creates the above-described print information, using each information item acquired by the above-described process, stores (registers) the created print information in the individual print job log database 33C, and then ends this print job log registration process.

The print job log registration process is performed whenever the printing by the physical printer or the printing by the virtual printer (the creation of electronic data) is performed to construct the individual print job log database 33C illustrated in FIG. 9 as an example.

Figure 11:
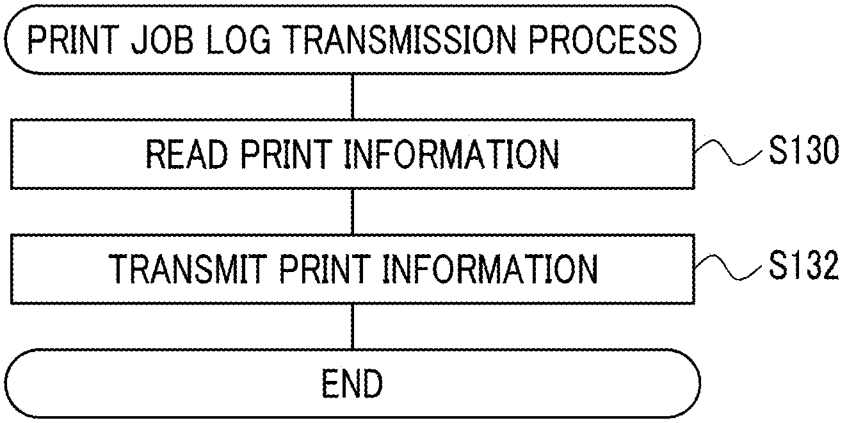
FIG. 11 is a flowchart illustrating an example of a print job log transmission process according to the exemplary embodiment of the present disclosure.

Next, the operation of the terminal apparatus 30 in a case in which a print job log transmission process is performed will be described with reference to FIG. 11. FIG. 11 is a flowchart illustrating an example of the print job log transmission process according to this exemplary embodiment.

In this exemplary embodiment, in each of the terminal apparatuses 30, the CPU 31 of the terminal apparatus 30 executes the print job log transmission program 33B at a predetermined time (in this exemplary embodiment, 6:00 p.m. every day) to perform the print job log transmission process illustrated in FIG. 11.

In Step S130 of FIG. 11, the CPU 31 reads print information for one day before this point of time from the individual print job log database 33C. In Step S132, the CPU 31 transmits the read print information to the server 10 and then ends this print job log transmission process.

Print information corresponding to each of the printing by the physical printer and the printing by the virtual printer performed by each of the terminal apparatuses 30 is transmitted (uploaded) every day from each of the terminal apparatuses 30 to the server 10 by the above-described print job log transmission process.

Figure 12:
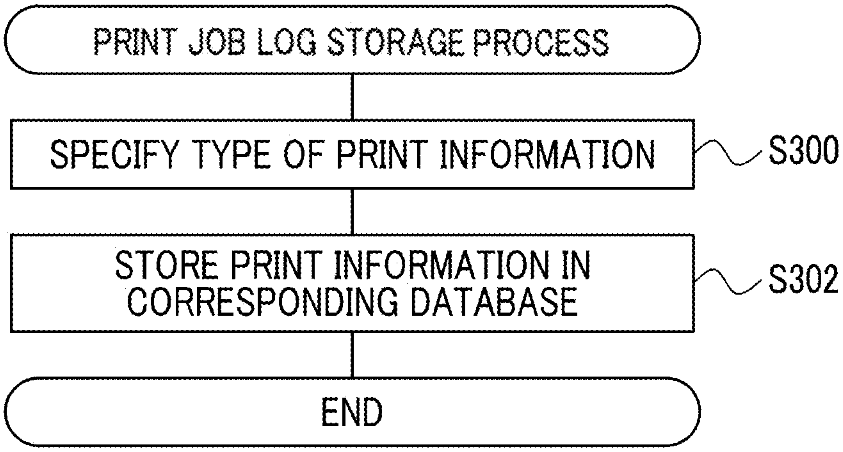
FIG. 12 is a flowchart illustrating an example of a print job log storage process according to the exemplary embodiment of the present disclosure.

Next, the operation of the server 10 in a case in which a print job log storage process is performed will be described with reference to FIG. 12. FIG. 12 is a flowchart illustrating an example of the print job log storage process according to this exemplary embodiment.

In this exemplary embodiment, the CPU 11 of the server 10 executes the print job log storage program 13A at the time when the print information is received from any of the terminal apparatuses 30 to perform the print job log storage process illustrated in FIG. 12.

In Step S300 of FIG. 12, the CPU 11 specifies a type corresponding to the printer driver name in the print information received from the terminal apparatus 30 with reference to the printer driver name database 13D. Therefore, the CPU 11 specifies whether the printer driver corresponding to the printer driver name is for a virtual printer or for a physical printer.

In Step S302, the CPU 11 stores the received print information in one of the virtual print job log database 13E and the physical print job log database 13F which corresponds to the specified type and then ends this print job log storage process. In addition, the company and the office which are the storage destinations of the print information can be specified by specifying the company and the office to which the user indicated by the user name included in the received print information belongs. Therefore, a database for specifying the company and office of each user is also constructed in the storage unit 13 of the server 10, which is not illustrated.

The print information corresponding to each of the virtual print job log database 13E and the physical print job log database 13F is stored in the virtual print job log database 13E and the physical print job log database 13F by the above-described print job log storage process. In this way, these databases are constructed.

Figure 13:
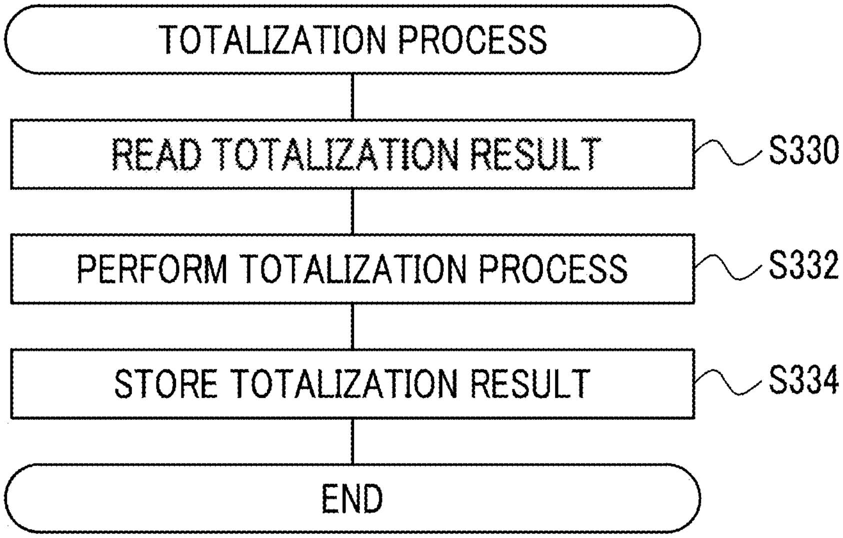
FIG. 13 is a flowchart illustrating an example of a totalization process according to the exemplary embodiment of the present disclosure.

Next, the operation of the server 10 in a case in which a totalization process is performed will be described with reference to FIG. 13. FIG. 13 is a flowchart illustrating an example of the totalization process according to this exemplary embodiment.

In this exemplary embodiment, in the server 10, the CPU 11 executes the totalization program 13B at a predetermined time (in this exemplary embodiment, 0:00 a.m. every day) to perform the totalization process illustrated in FIG. 13.

In Step S330 of FIG. 13, the CPU 11 reads the print information for one day before this point of time from the virtual print job log database 13E and the physical print job log database 13F. In Step S332, the CPU 11 calculates three types of information, that is, the electronic file ratio efr, the number-of-printed-sheets suppression ratio vrr, and the number of sheets reduced vrn for each company, each office, and each user, using the read print information, as described above. In Step S334, the CPU 11 stores (registers) the calculated information in the totalization result database 13G and then ends this totalization process. In addition, in this exemplary embodiment, the three types of information for each company are calculated as an average value of corresponding information for all of the users belonging to the corresponding company. Further, in this exemplary embodiment, the three types of information for each office are also calculated as an average value of the corresponding information for all of the users belonging to the corresponding office. However, the present disclosure is not limited to this aspect. The target users may be limited to some users, or a median value or a mode value may be applied instead of the average value.

The content registered in the totalization result database 13G is updated every day by the above-described totalization process.

As described above, in this exemplary embodiment, the totalization result is updated to correspond to the information for the latest day. However, the present disclosure is not limited thereto. For example, the totalization result may be updated to correspond to the information corresponding to the latest month, or the totalization result may be updated to correspond to all of the information accumulated in the past. Further, in this exemplary embodiment, the totalization result is updated every day. However, the present disclosure is not limited thereto. For example, the totalization result may be updated every month or every three months.

Figure 14:
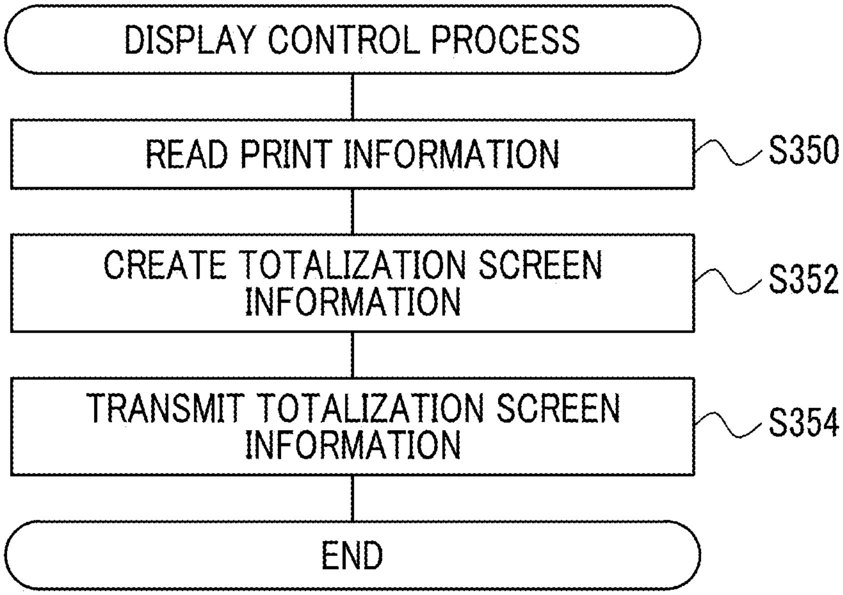
FIG. 14 is a flowchart illustrating an example of a display control process according to the exemplary embodiment of the present disclosure.

Next, the operation of the server 10 in a case in which a display control process is performed will be described with reference to FIG. 14. FIG. 14 is a flowchart illustrating an example of the display control process according to this exemplary embodiment.

In this exemplary embodiment, in the server 10, the CPU 11 executes the display control program 13C at a time when request information requiring the display of the totalization result of the totalization process is received together with information specifying the user (in this embodiment, the above-described user information) in response to the operation of the user on any of the terminal apparatuses 30. Then, the display control process illustrated in FIG. 14 is performed.

In Step S350 of FIG. 14, the CPU 11 reads all information from the totalization result database 13G. In Step S352, the CPU 11 creates screen information that can display a totalization screen having a predetermined configuration, using the read information. In Step S354, the CPU 11 transmits the created screen information to the terminal apparatus 30 which is an access source and then ends the display control process.

The totalization screen is displayed on the display unit 35 of the terminal apparatus 30 which is an access source by the above-described display control process.

Figure 15:
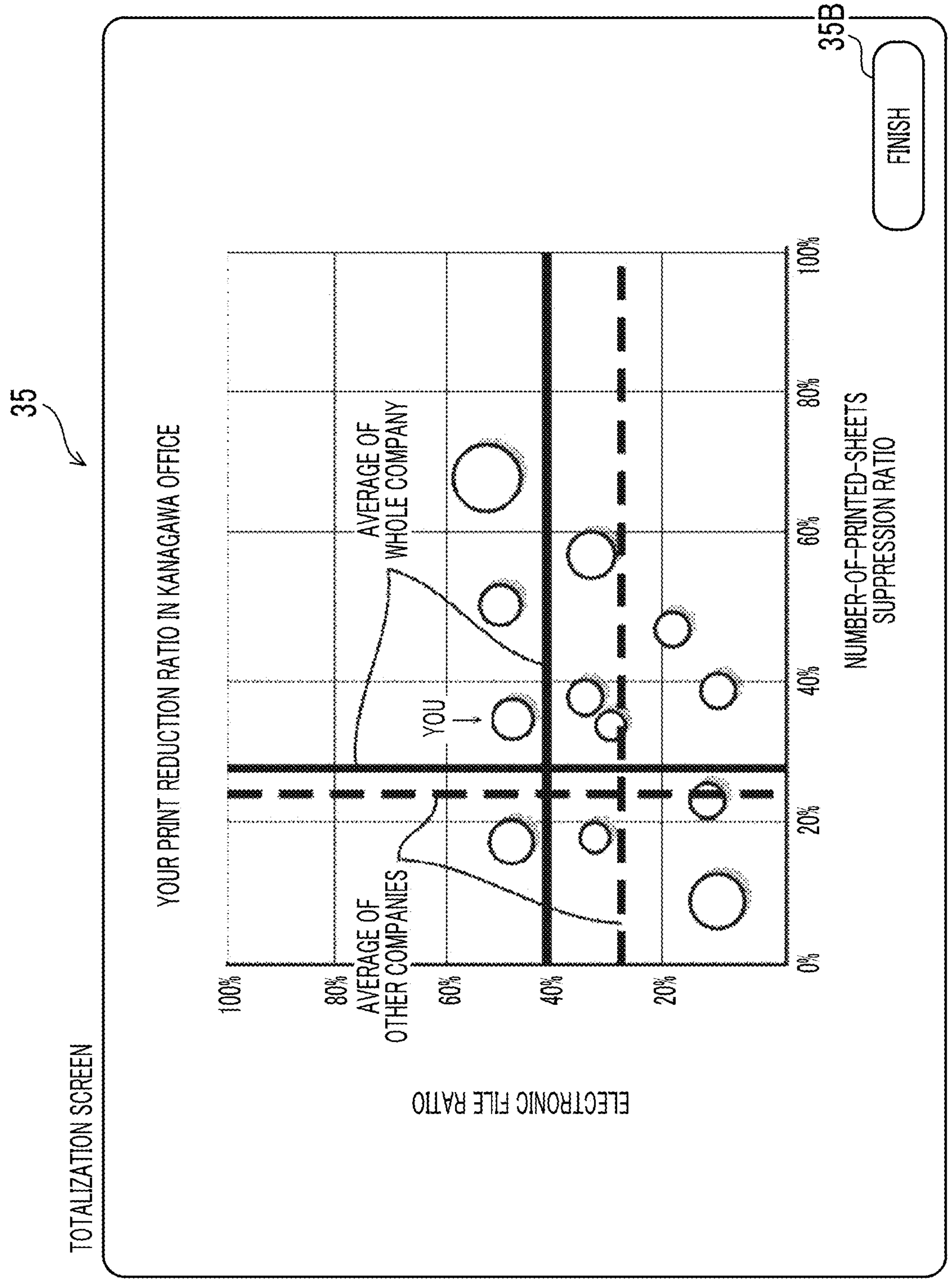
FIG. 15 is a front view illustrating an example of a totalization screen according to the exemplary embodiment of the present disclosure.

FIG. 15 illustrates an example of the totalization screen according to this exemplary embodiment.

As illustrated in FIG. 15, for the office to which the user who is the access source belongs, a graph, in which the horizontal axis indicates the number-of-printed-sheets suppression ratio vrr, the vertical axis indicates the electronic file ratio efr, and a circle whose diameter increases as the number of sheets reduced vrn increases is plotted for each user, is displayed on this totalization screen. Further, a straight line indicating the average value of the whole company to which the user, who is the access source, belongs and a straight line indicating the average value of other companies are displayed on the graph.

Therefore, the user can compare the number-of-printed-sheets suppression ratio vrr, the electronic file ratio efr, and the number of sheets reduced vrn for the user with the average value of the whole company to which other users or the user belongs and the average value of other companies with reference to the totalization screen to intuitively understand the number-of-printed-sheets suppression ratio vrr, the electronic file ratio efr, and the number of sheets reduced vrn.

As described above, in this exemplary embodiment, the display of the totalization screen is performed by the terminal apparatus 30 at the time when the request information is received from the terminal apparatus 30. However, the present disclosure is not limited thereto. For example, the totalization screen may be displayed at a time when printing is performed by the virtual printer and the physical printer. The device for displaying the totalization screen is not limited to the terminal apparatus 30, and the totalization screen may be displayed by the image forming apparatus 50 or the server 10.

In addition, in the above-described exemplary embodiment, the type of electronic output is not mentioned. However, the reduction value of the sheets may be displayed for each type of electronic output.

As a specific example of this aspect, the acquisition unit 11A can further acquire information indicating the type of electronic output, and the control unit 11C can perform control to display the reduction value of the sheets for each type indicated by the acquired information.

In this aspect, at least one of an output of a scanned image, an output by printing, or an output of a printed image may be applied as the type of electronic output. Here, the output of the scanned image includes direct facsimile transmission and the transmission of scan data from the image forming apparatus 50 to the terminal apparatus 30, and the output of the printed image includes transmission by e-mail. In addition, the direct facsimile transmission is a function of transmitting a document created on a client to a facsimile of the other party through a device in the same operation as that for printing the document on the device.

Figure 16:
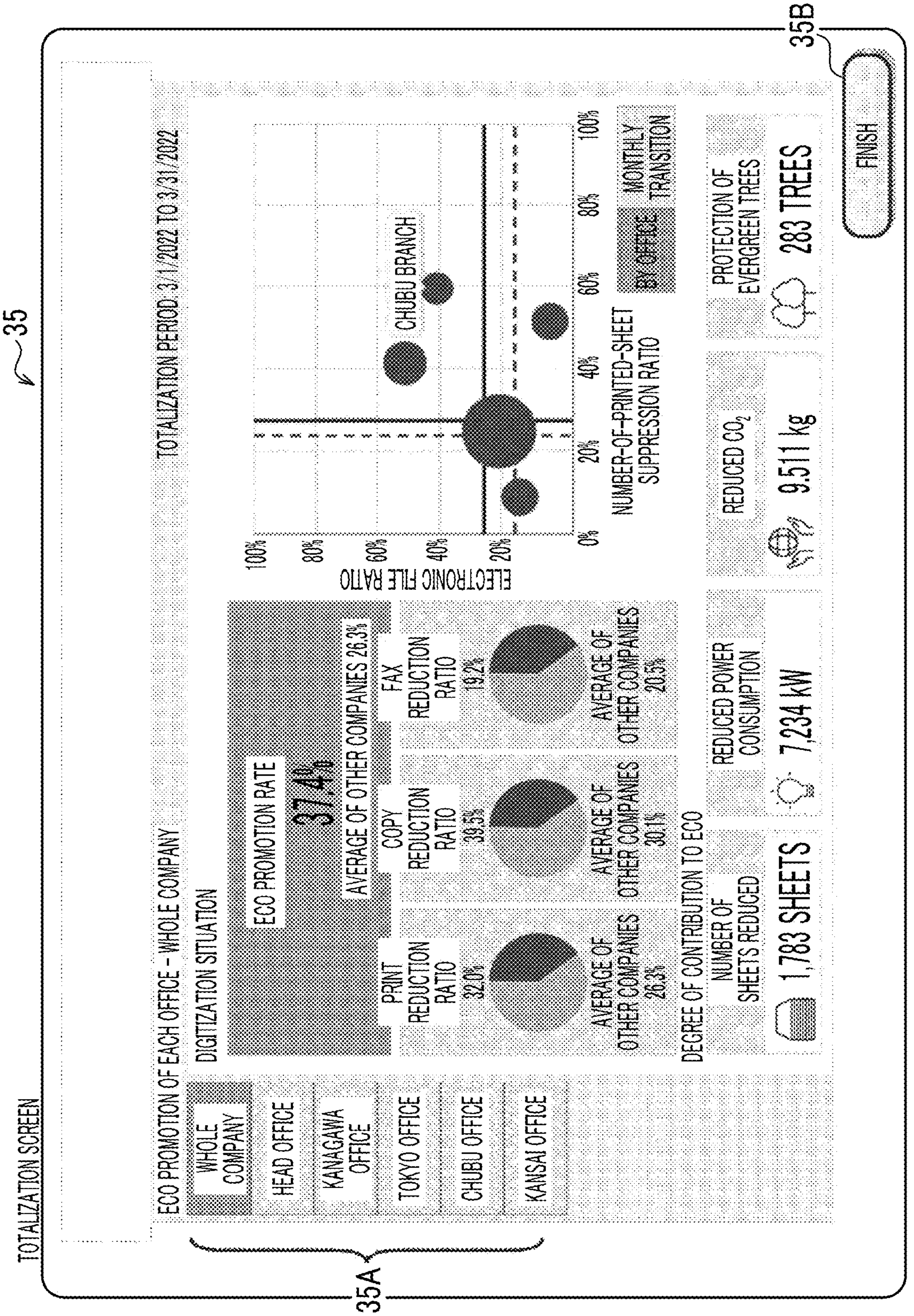
FIG. 16 is a front view illustrating another example of the totalization screen according to the exemplary embodiment of the present disclosure.

FIG. 16 illustrates an example of a totalization screen according to this aspect. As illustrated in FIG. 16, the reduction ratio of the sheets (represented by a "print reduction ratio" in FIG. 16) related to output by printing, the reduction ratio of the sheets related to scanned images (represented by a "copy reduction ratio" in FIG. 16), and the reduction ratio of the sheets related to facsimile transmission (represented by a "FAX reduction ratio" in FIG. 16) are displayed on the totalization screen. Therefore, the user may intuitively understand the reduction ratio of the sheets for each type of electronic output with reference to this totalization screen.

In addition, on the totalization screen illustrated in FIG. 16, the range whose totalization results are to be displayed can be designated by buttons 35A, and the user can designate any of the buttons 35A to display the totalization results of a desired range. Further, the same graph as that illustrated in FIG. 15 is displayed on the totalization screen illustrated in FIG. 16. In addition, information indicating the degree of contribution to other environments, such as reduced power consumption, reduced $CO_2$, and protection of evergreen trees, is also displayed on the totalization screen. Therefore, it is possible to easily understand these information items with reference to the totalization screen.

Further, in this aspect, the acquisition of the information indicating the type by the acquisition unit 11A may be performed by the terminal apparatus 30 or may be performed by the image forming apparatus 50.

In addition, the configuration of the totalization screen is not limited to the configurations illustrated in FIGS. 15 and 16. It goes without saying that some information may be deleted, new information added, or the display position and display size of each information item may be changed.

Further, in the above-described exemplary embodiment, the case in which information at the time when electronic output is performed is acquired as the information related to the electronic output of data to derive and display the reduction value of the sheets on the basis of the created electronic data has been described. However, the present disclosure is not limited thereto. For example, the acquisition unit 11A may further acquire transmission information related to the transmission of electronic data to an external apparatus which corresponds to the output of the data to the sheets. In this aspect, the derivation unit 11B derives a reduction value of the sheets in a case in which the data is output to the sheets using the electronic data, according to transmission indicated by the transmission information acquired by the acquisition unit 11A, and the control unit 11C displays the reduction value.

That is, in the above-described exemplary embodiment, for the electronic data created by the virtual printer, only the reduction in the number of the sheets by the creation is considered. However, in practice, since the electronic data is transmitted to the external apparatus, the effect of reducing the number of sheets is enjoyed according to the number of transmissions and a usage pattern at a transmission destination. Therefore, the adoption of the aspect in which the reduction value of the sheet is derived using the transmission information and is presented enables the user to understand the reduction value obtained by the distribution of the electronic data to the external apparatus.

In addition, in the above-described exemplary embodiment, a case in which the composite reduction ratio obtained by combining the reduction ratio of the sheets by the electronic output and the reduction ratio of the sheets by the aggregate printing is derived and the derived composite reduction ratio is displayed has been described. However, the present disclosure is not limited thereto. For example, control to individually display each of the reduction ratio of the sheets by the electronic output and the reduction ratio of the sheets by the aggregate printing may be performed.

In this case, as the expressions for calculating the number of sheets reduced vrn and the number-of-printed-sheets suppression ratio vrr, the following Expression (4) may be applied instead of the Expression (1), and the following Expression (5) may be applied instead of the Expression (2). The number of sheets reduced and a number-of-printed-sheets suppression ratio that do not take into account the reduction value of the sheets by the aggregate printing can be obtained from these expressions.

$$vrn2 = VLP \tag{4}$$

$$vrr2 = \frac{VLP}{RLP + VLP} = \frac{vrn2}{RLP + VLP} \tag{5}$$

Further, in the above-described exemplary embodiment, the case in which the technique of the present disclosure is applied to the system including the server 10 has been described. However, the present disclosure is not limited thereto. For example, in a case in which the reduction value of the sheets by a single image forming apparatus 50 is displayed, the technique of the present disclosure may be applied to a system using only the image forming apparatus 50 and the terminal apparatus 30. In this case, the exchange of various types of information between the terminal apparatus 30 and the server 10 in the above-described exemplary embodiment is unnecessary. Further, in this case, the totalization process may be performed by either the terminal apparatus 30 or the image forming apparatus 50.

Furthermore, in the above-described exemplary embodiment, the case in which the various databases 13D to 13G are registered in the server 10 has been described. However, the present disclosure is not limited thereto. For example, these databases may be registered in any terminal apparatus 30, any image forming apparatus 50, or another device that can be accessed by the server 10.

The exemplary embodiment has been described above. However, the technical scope of the invention is not limited to the scope described in the above-described exemplary embodiment. Various modifications or improvements of the above-described exemplary embodiment can be made without departing from the gist of the invention, and the modified or improved exemplary embodiments are also included in the technical scope of the invention.

Further, the above-described exemplary embodiment does not limit the invention according to the claims, and not all combinations of features described in the exemplary embodiment are necessary for means for addressing the problems in the invention. The above-described exemplary embodiment includes inventions at various stages, and various inventions are extracted by combinations of a plurality of disclosed components. Even in a case in which some components are deleted from all of the components described in the exemplary embodiment, as long as the effect is obtained, the configuration in which some components are deleted can be extracted as an invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the above-described exemplary embodiment, the case in which various processes are implemented by a software configuration obtained by causing a computer to execute the program has been described. However, the present disclosure is not limited thereto. For example, the various processes may be implemented by a hardware configuration or a combination of a hardware configuration and a software configuration.

In addition, the configuration of the server 10 and the terminal apparatus 30 described in the above-described exemplary embodiment is an example, and it goes without saying that unnecessary portions may be deleted or new portions may be added without departing from the gist of the invention.

Further, the flow of various processes described in the above-described exemplary embodiment is also an example, and it goes without saying that unnecessary steps may be deleted, new steps may be added, or the processing order may be changed without departing from the gist of the invention.

Supplementary Note (((1)))

An information processing apparatus comprising:

a processor configured to:

- acquire information related to an electronic output of data;
- derive the number of sheets virtually output in a case in which the data is output by the sheets, using the acquired information related to the electronic output of the data; and
- perform control to display a reduction value of the sheets reduced by the electronic output of the data, using the derived number of sheets virtually output.

(((2)))

The information processing apparatus according to (((1))), wherein the processor is configured to:

- acquire a history of the information related to the electronic output of the data from a storage unit that stores the history;
- derive the total number of sheets output and the total number of sheets virtually output, using the acquired history;
- derive a reduction ratio of the sheets indicating a ratio of the derived total number of sheets virtually output to a sum of the derived total number of sheets output and the derived total number of sheets virtually output; and
- perform control to display the derived reduction ratio of the sheets as the reduction value.

(((3)))

The information processing apparatus according to (((2))), wherein the processor is configured to:

- further acquire a history of information indicating aggregate printing in which a plurality of pages are collectively printed on the sheet;
- further derive a reduction ratio of the sheets by the aggregate printing, using the acquired history of the information indicating the aggregate printing; and
- perform control to display the reduction ratio of the sheets by the aggregate printing together with the reduction ratio of the sheets by the electronic output.

(((4)))

The information processing apparatus according to (((3))), wherein the processor is configured to:

- perform control to individually display each of the reduction ratio of the sheets by the electronic output and the reduction ratio of the sheets by the aggregate printing.

(((5)))

The information processing apparatus according to (((3))), wherein the processor is configured to:

derive a composite reduction ratio obtained by combining the reduction ratio of the sheets by the electronic output and the reduction ratio of the sheets by the aggregate printing; and perform control to display the derived composite reduction ratio.

(((6)))

The information processing apparatus according to any one of (((1))) to (((5))), wherein the processor is configured to:

further acquire information indicating a type of the electronic output; and perform control to display the reduction value of the sheets for each type indicated by the acquired information.

(((7)))

The information processing apparatus according to (((6))), wherein the type of the electronic output is at least one of an output of a scanned image, an output by printing, or an output of a printed image.

(((8)))

The information processing apparatus according to any one of (((1))) to (((7))), wherein the processor is configured to:

acquire the history of the information related to the electronic output of the data from a storage unit that stores the history for each user;

derive the reduction value for each user using the acquired history; and perform control to display the derived reduction value for each user.

(((9)))

The information processing apparatus according to any one of (((1))) to (((8))), wherein the processor is configured to:

acquire information at a time when the electronic output is performed as the information related to the electronic output of the data.

(((10)))

The information processing apparatus according to any one of (((1))) to (((9))), wherein the processor is configured to:

further acquire transmission information related to transmission of electronic data to an external apparatus that corresponds to the output of the data to the sheet; and derive the reduction value of the sheets in a case in which the data is output to the sheets using the electronic data according to the transmission indicated by the acquired transmission information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:

a processor configured to:

acquire a history of information related to an electronic output of data and printer drivers associated therewith;

derive the number of sheets output by a physical printer and the number of sheets virtually output by a virtual printer using the acquired history;

derive a reduction ratio of the sheets indicating a ratio of the derived number of sheets virtually output by the virtual printer to a sum of the derived number of sheets output by the physical printer and the derived number of sheets virtually output by the virtual printer; and perform control to display information indicating the derived number of sheets virtually output by the virtual printer being less than the derived number of sheets output by the physical printer based on the reduction ratio.

2. The information processing apparatus according to claim 1, wherein the processor is configured to:

further acquire a history of information indicating aggregate printing in which a plurality of pages are collectively printed on the sheet;

further derive a reduction ratio of the sheets by the aggregate printing, using the acquired history of the information indicating the aggregate printing; and perform control to display the reduction ratio of the sheets by the aggregate printing together with the reduction ratio of the sheets by the electronic output.

3. The information processing apparatus according to claim 2, wherein the processor is configured to:

perform control to individually display each of the reduction ratio of the sheets by the electronic output and the reduction ratio of the sheets by the aggregate printing.

4. The information processing apparatus according to claim 2, wherein the processor is configured to:

derive a composite reduction ratio obtained by combining the reduction ratio of the sheets by the electronic output and the reduction ratio of the sheets by the aggregate printing; and perform control to display the derived composite reduction ratio.

5. The information processing apparatus according to claim 1, wherein the processor is configured to:

further acquire information indicating a type of the electronic output; and perform control to display the reduction value of the sheets for each type indicated by the acquired information.

6. The information processing apparatus according to claim 5, wherein the type of the electronic output is at least one of an output of a scanned image, an output by printing, or an output of a printed image.

7. The information processing apparatus according to claim 1, wherein the processor is configured to:

acquire the history of the information related to the electronic output of the data from a storage unit that stores the history for each user;

derive a reduction value for each user using the acquired history; and perform control to display the derived reduction value for each user.

8. The information processing apparatus according to claim 1, wherein the processor is configured to:

acquire information at a time when the electronic output is performed as the information related to the electronic output of the data.

9. The information processing apparatus according to claim 1, wherein the processor is configured to:

further acquire transmission information related to transmission of electronic data to an external apparatus that corresponds to the output of the data to the sheet; and derive the reduction ratio of the sheets in a case in which the data is output to the sheets using the electronic data according to the transmission indicated by the acquired transmission information.

10. A non-transitory computer readable medium storing a program that causes a computer to execute a process comprising:

acquiring a history of information related to an electronic output of data and printer drivers associated therewith;

deriving the number of sheets output by a physical printer and the number of sheets virtually output by a virtual printer using the acquired history;

deriving a reduction ratio of the sheets indicating a ratio of the derived number of sheets virtually output by the virtual printer to a sum of the derived number of sheets output by the physical printer and the derived number of sheets virtually output by the virtual printer; and performing control to display information indicating the derived number of sheets virtually output by the virtual printer being less than the derived number of sheets output by the physical printer based on the reduction ratio.

11. An information processing method comprising:

acquiring a history of information related to an electronic output of data and printer drivers associated therewith;

deriving the number of sheets output by a physical printer and the number of sheets virtually output by a virtual printer using the acquired history;

deriving a reduction ratio of the sheets indicating a ratio of the derived number of sheets virtually output by the virtual printer to a sum of the derived number of sheets output by the physical printer and the derived number of sheets virtually output by the virtual printer; and performing control to display information indicating the derived number of sheets virtually output by the virtual printer being less than the derived number of sheets output by the physical printer based on the reduction ratio.

* * * * *